April 7, 1953 — C. VAN AUSDALL — 2,633,690
SICKLE SHOE AND DIVERTER
Filed July 17, 1951 — 2 SHEETS—SHEET 2
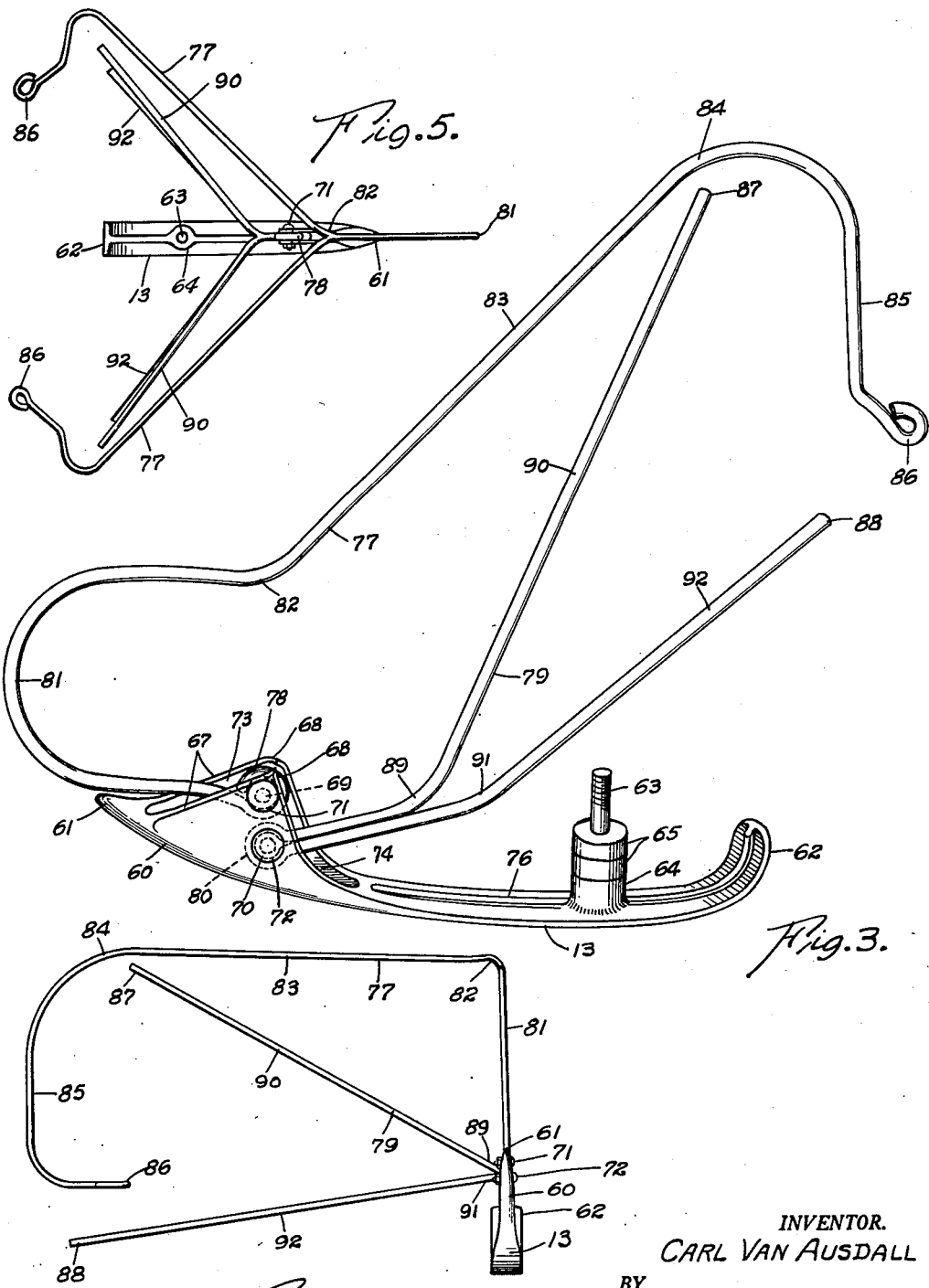
INVENTOR.
CARL VAN AUSDALL
BY Joseph F. Zugelter
Atty.

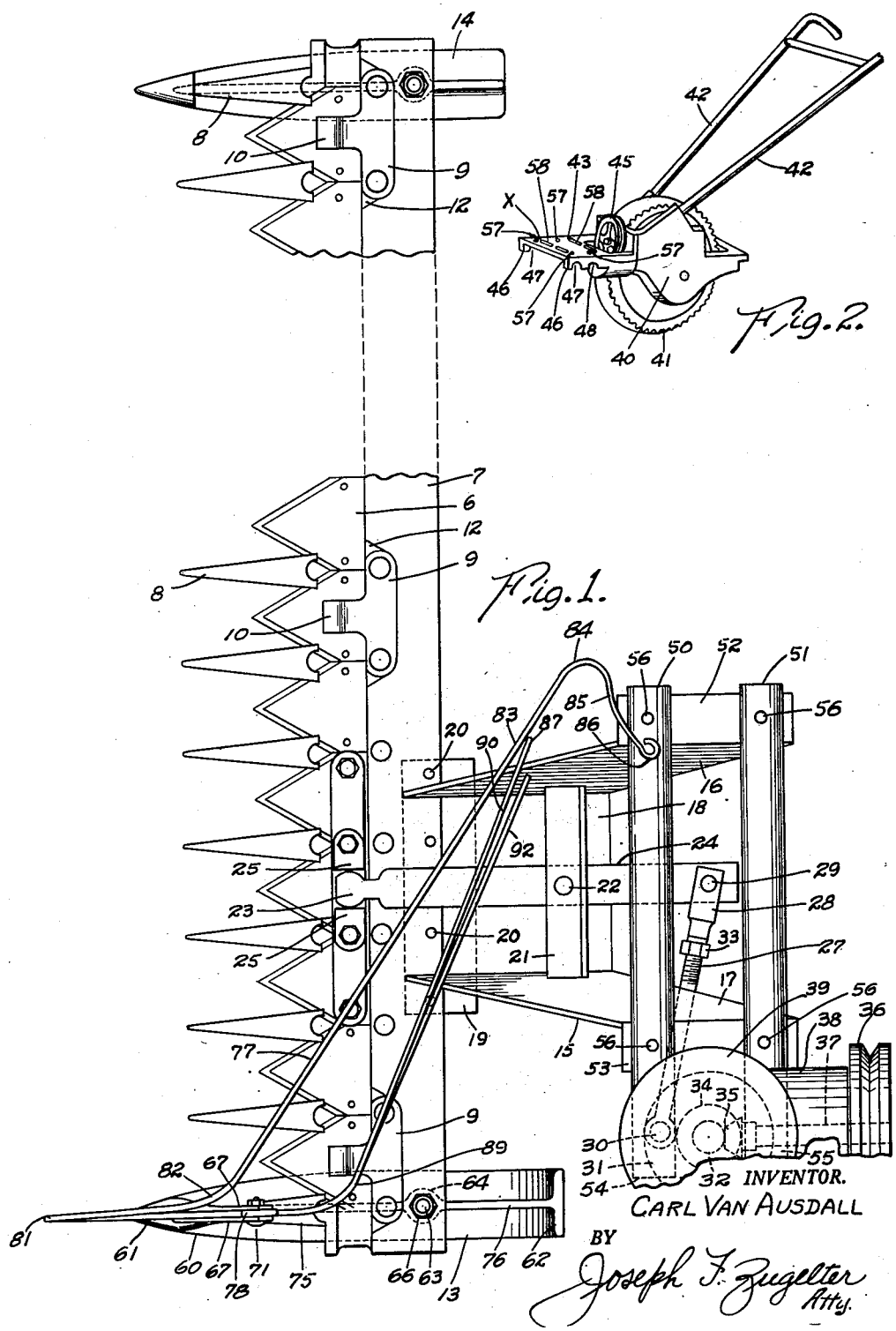

Patented Apr. 7, 1953

2,633,690

UNITED STATES PATENT OFFICE 2,633,690

SICKLE SHOE AND DIVERTER

Carl Van Ausdall, Liberty, Ind.

Application July 17, 1951, Serial No. 237,107

10 Claims. (Cl. 56—314)

The present invention relates to a shoe and diverter for attachment to a mower of the sickle variety, incorporating a reciprocating cutter or knife.

An object of the invention is to provide improved and simplified means for diverting cuttings from the path of advancement of the tractor upon which the sickle is mounted, so as to avoid accumulations which might interfere with proper operation of the tractor or the sickle.

More specifically, it is an object of the present invention to ensure uninterrupted mowing operations, by effective diversion of cuttings away from vital operating parts of the sickle, its driving mechanism, and the motor and other vital parts of the tractor upon which the sickle is mounted.

Another object is to provide an improved shoe and diverter construction which is simple and inexpensive to manufacture and assemble, and which may be attached to a sickle or removed therefrom with ease and dispatch.

A further object of the invention is the elimination of driven parts in the performance of the diverting action, thereby to enhance safety of usage and reduce maintenance and servicing requirements, and in addition, conserve power that would otherwise be demanded of the tractor engine.

The foregoing and other objects are attained by the means described herein and illustrated upon the accompanying drawings, in which:

Fig. 1 is a fragmentary top plan view of a sickle type of mower, with the shoe and diverter of the invention applied thereto.

Fig. 2 is a perspective view, on a greatly reduced scale, showing a garden tractor (minus the motor) upon which the assembly of Fig. 1 may be mounted.

Fig. 3 is an enlarged detail view, in side elevation, showing the shoe and diverter detached from the sickle.

Fig. 4 is a front elevational view of the device illustrated by Fig. 3, looking from left to right, the figure being on a reduced scale.

Fig. 5 is a top plan view of a modified form of diverter, adapted to divide the vegetation and divert it in opposite lateral directions.

The device of the present invention constitutes a departure from the device disclosed in my issued Patent No. 2,509,114, dated May 23, 1950, principally as to the construction of the means employed for diverting cuttings. In other respects, said patent may be referred to for any information desired concerning structural features of the sickle and its driving relationship with the tractor, these being matters more or less foreign to the present invention, except in a general way.

With reference to the accompanying drawings, Fig. 1 illustrates a sickle comprising the usual reciprocating knife assembly 6, mounted slidingly upon a cutter bar 7 which carries the guards 8 and their associated stationary cutters, not shown. As is customary, the knife assembly reciprocates in a longitudinal way, and the knives thereof are held in shearing relation to the stationary cutters by means of hold-down plates 9 having arched fingers 10 which bear upon the movable knives as shown. The usual wear plates for guiding the reciprocating knife assembly, are indicated at 12.

To support the cutter bar above ground level, opposite ends of the bar are provided with shoes 13 and 14. These shoes are adjustable upon the cutter bar, to vary the height above ground level at which the cutting will be performed. The details of the shoes will be disclosed at length hereinafter, particularly as to the special shoe 13 which forms part of the present invention.

The operating mechanism for the knives of the sickle may include a main frame 15 generally U-shaped in transverse section, having upwardly divergent side walls 16 and 17, and a substantially horizontal bottom wall 18, the forward end of which is fixed to a heavy reinforcing or strengthening plate 19, which in turn is secured flatwise to the cutter bar 7, preferably to one side of center as shown. The connection between plate 19 and cutter bar 7, may be effected by means of bolts, rivets, or other fastening means 20. By means of this connection, the sickle proper receives rigid support from the main frame 15, which may be formed from heavy metal sheet.

At a short distance above the bottom wall 18 of the frame 15, a strut or brace 21 may be located between the side walls, to form a rigid support for a pivot 22 carrying the rocker bar 24. The strut or brace may consist of a short length of angle iron having its opposite ends welded to the frame side walls, or otherwise fixedly secured thereto. The forward end of the rocker bar carries a head or bearing 23 embraced between two upstanding fixed lugs 25—25 formed on a bracket 26 which is attached to the reciprocating knife assembly 6. As will readily be understood, horizontal rocking of the bar 24 about the pivot 22, will enforce longitudinal reciprocation of the knife assembly 6, in performance of the cutting action of the sickle.

Actuation of the rocker bar may be effected by means of a pitman 27, one end of which has a clevis head 28 pivoted to the rear end of the rocker bar at 29, whereas the opposite end of the pitman has a pivotal connection 30 upon a rotatable wheel 31, the connection being eccentric so that rotation of the wheel 31 about the axis of its supporting shaft 32 results in oscillation of the pitman. The length of the pitman may be adjusted by means of the nut 33, to register the knives and cutters. By means of a pair of gears 34 and 35, rotation of a drive pulley 36 may be transmitted to the eccentric or wheel 31, through shafts 37 and 32. The driving mechanism above described may be enclosed within a protective housing 38, 39, which may also carry lubricant for the gears and shafts.

As fully set forth in my aforesaid issued Patent No. 2,509,114, the sickle is to be quickly attachable to the garden tractor of Fig. 2. The tractor includes a frame 40 carrying a traction wheel 41, handles 42, and a forwardly extending plate 43 which serves to support a suitable motor, not shown. By means of a belt and pulley arrangement, power from the motor may be transmitted to the driving pulley 45 which has geared connection with the traction wheel.

The motor mounting plate 43 includes opposed depending lips or side aprons 46, notched as at 47—48, to accommodate the transverse mounting bars of the sickle, indicated at 50 and 51 of Fig. 1. These bars or shafts are fixed in spaced parallelism, to the main frame 15 of the sickle. Preferably, the bars or shafts are secured to outwardly directed flanges or lips 52 and 53 of the main frame, and corresponding ends 54—55 thereof adjustably support the gear housing 38—39, as fully explained in my issued patent aforesaid. A plurality of holes 56 are drilled transversely and vertically through the bars near their ends, to accommodate bolts or other fasteners which enter also the plurality of correspondingly spaced holes 57 drilled or formed in the motor mounting plate 43, these latter holes terminating in the notches 47—48. The construction just described provides for detachable mounting of the Fig. 1 sickle assembly upon the motor mounting plate 43 of Fig. 2. When the sickle assembly is so mounted, it may be driven from the tractor motor by a suitable belt trained over the motor pulley and the pulley 36 of Fig. 1, as will be understood.

It may here be pointed out that the motor mounting plate of the tractor has a series of elongated holes or slots 58, preferably four or more in number, adapted to receive bolts by which the motor base is securely fixed upon the mounting plate. One of such bolts, as will be explained later, can be used as an anchorage for the diverter presently to be described.

The improved shoe and diverter of the present invention may be applied to either end of the cutter bar, although in the preferred arrangement it is applied to that end which is nearest to the motor mounting plate. The shoe, indicated at 13, has a forward toe portion 60 which gradually turns upwardly, and by preference, though not of necessity, terminates in a point 61. The heel of the shoe likewise turns upwardly, and is indicated at 62. Intermediate the toe and the heel, the shoe carries a fixed upstanding threaded stud 63, the head end of which may be anchored in a boss 64 which is formed integral with the shoe. Spacers 65 on the stud may be in the form of removable washers upon which the cutter bar rests, the number and the thickness of the spacers determining the height at which the sickle is supported above ground level. A nut 66, Fig. 1, secures the cutter bar to the shoe stud, the stud passing through a vertical hole provided in the cutter bar.

At the toe portion of the shoe, rearwardly of the pointed end 61, the shoe has a pair of spaced upstanding wings 67, each of which may be approximately triangular in shape, with apices 68 directed upwardly. Near the apex of each wing, and at a lower point below, the wings are drilled transversely to provide apertures 69 and 70 for the reception of bolts or other fasteners 71 and 72. The channel or space 73 between the wings is adapted to receive the anchorage ends of certain parts which constitute the diverter, and at the rear portion of the wings the space is properly dimensioned, at 74, to receive the point of the endmost cutter guard which is indicated at 75 upon Fig. 1. With the point of guard 75 inserted into the shoe space at 74, and the stud 63 secured to the cutter bar by nut 66, the shoe is securely locked to the sickle in position to slide over the earth. The shoe may be provided with a longitudinal upstanding reinforcing rib 76, if desired.

The wings of the shoe are adapted to embrace between them the anchorage ends of the diverter constituents, one of which is a bent metal rod 77 having an eye 78 formed on its lower end. The eye fits between the wings, and through it passes the upper bolt or fastener 71, which provides a firm connection. The second bent metal rod, indicated at 79, forms another constituent of the diverter, and has an eye 80 formed intermediate its ends to receive the bolt or fastener 72. This eye 80 likewise is embraced by the wings of the shoe.

Immediately ahead of the eye 78, the rod 77 is directed forwardly of the shoe, beyond the toe point 61, and is turned upwardly to form an approximate half-loop 81 which rests in a substantially vertical plane, or in the approximate plane of the channel 73. At the top of the loop, a bend 82 is formed which directs the head portion 83 of the rod obliquely to one side of shoe, and slightly upwardly, to a location 84 at which an approximate quarter-circle bend directs the rod downwardly along an approximately vertical line, to form the inner end reach 85 of the diverter as a whole. The terminal end of the reach 85 is turned at an approximate right angle, rearwardly and toward the vertical plane of the shoe, where said end is developed into an eye 86 which rests in a substantially horizontal plane. This eye is adapted to receive therein one of the bolts which passes through an elongate slot 58 of the motor mounting plate, and the base of the motor, so as to provide a firm anchorage for the rearmost end of the diverter rod 77. This shaped rod 77 may be referred to as the rigid or stationary outer frame portion of the diverter. As indicated upon Fig. 1, the rod 77 extends obliquely across the full width of the sickle main frame 15. The height of the head portion 83 of the rod is considerable, and is well above the level of the motor mounting plate, by an amount equal to the height of bend 84 above the terminal eye 86. The head portion 83 therefore, is effective to divert cuttings away from the tractor motor, which motor is located rearwardly of the eye 86. A comparison of Fig. 1 with Fig. 2 will reveal that eye 86 will register with the slot 58 which is identified also by the reference character X upon Fig. 2. Thus, it is evident that the diverter head portion 83 completely spans the forward end of the tractor and its motor.

The second rod 79 of the diverter is a shaker member. It may have one or more free terminal ends, such as 87 and 88, disposed remotely from the anchorage point 72, which renders the arms or branches vibratory in character because of the inherent resiliency of the rod metal. The rod 79 may be of one single piece, if desired, bent approximately at its middle to provide the eye 80. Rearwardly of the eye 80, the upper arm or branch is bent at 89 inwardly in the general direction of head portion 83, and upwardly to the extent that the free end 87 of its straight portion 90 terminates approximately within the bend 84 of the head portion. The other arm or lower branch has a bend at 91 directing the straight portion 92 slightly downwardly (see Fig. 4), the free end 88 thereof terminating below but slightly ahead of the eye 86 of the outer frame portion of the diverter. All of the straight portions 83, 90 and 92 may be disposed approximately in an oblique plane which is approximately vertical or perhaps slightly inclined forwardly and upwardly, as indicated upon the top plan view of Fig. 1; however, all the rods are bendable to somewhat varied co-relationships which may be selected by the user as being most appropriate to meet any particular diverting problem or condition. The relative disposition of the parts as herein set forth, is considered approximately correct for general usage of the diverter.

It may here be pointed out that the bolt or fastener 72 which secures the vibratory diverter 90, 92 to the shoe, may be permitted to remain loose so as not to rigidly clamp the eye 80 between the shoe wings. This induces a maximum amount of action in the diverter as the sickle is operated, and serves to keep the cuttings in motion for rapid and certain diversion. The bolt 71 which anchors the stationary outer frame portion of the diverter at the shoe, may preferably be securely tightened upon the eye 78 to furnish a firm anchorage. In addition, the apices 68 of the triangular wings may be pounded inwardly over the eye, as shown upon Fig. 3, to further lock the eye 78 to the shoe.

As was stated previously herein, a second shoe 14 is provided at the opposite end of the cutter bar. This second shoe may be conventional in character, or it may closely resemble the shoe 13, if desired, particularly as concerns the mounting thereof upon the cutter bar and the guard 8. It may be noted that the shoes 14 and 13 are interchangeable, so that one may be substituted for the other in the event that cuttings are to be diverted in a direction opposite to that which results from the present disclosure. Any such reversal or interchange of shoes, however, will require re-bending of the diverter rods to fit the changed situation.

It is sometimes desirable to apply a diverter to the sickle at some point intermediate the ends of the cutter bar, so as to divide the standing or uncut vegetation and divert it outwardly in opposite directions toward the ends of the cutter bar. A diverter for this purpose is illustrated by Fig. 5, wherein the shoe 13 is exactly the same as previously described herein, but the diverter rod structure is duplicated at opposite sides of the shoe. Referring specifically to Fig. 5, 61 indicates the pointed toe of the shoe over which is extended the half-circular loop 81, as in Fig. 3. At the location of the outward bend 82, the diverter rod 77 branches out in opposite directions, to form two rigid or stationary outer frame portions of the double diverter, each provided with an anchor means 86 for attachment to the tractor frame as hereinbefore set forth. The vibratory or shaker rods, likewise, are duplicated at opposite sides of the shoe, and as indicated at 90, 92 and 90, 92 of Fig. 5, these rods bear a relationship to the rods 77 which corresponds to the relationship illustrated by Figs. 1, 3 and 4.

The double arrangement of Fig. 5 is easily constructed by simply welding an extra set of rods 77, 90, 92 to a diverter structure such as is disclosed by Figs. 1, 3 and 4. The manner of mounting the double diverter upon the shoe may be the same as in the case of Fig. 3 utilizing eyes 78 and 80 secured between the spaced wings of the shoe.

As will be understood, the shoe 13 without any change, may be applied to any cutter guard of the sickle since the guards are all identical and will therefore fit into the socket or channel 74 of the shoe. When a shoe is applied to an intermediate cutter guard, it is necessary of course to drill the cutter bar for accommodating the stud 63 of the shoe, to obtain a rigid mounting for the shoe.

It is important to note that the forward loop 81 of the stationary outer frame of the diverter, projects well in advance of the sickle knives or cutters, so that it performs as a divider of standing or uncut vegetation. Thus, the vegetation before actually being cut off by the sickle, is subjected to lateral displacement by the diverter rods. This results in an initial deflection of rooted or uncut vegetation along the diverter rods, which is much more positive and forceful than that of cuttings, to enforce continued progression of cuttings toward and off the trailing or rear ends of the rods. Moreover, by so dividing the vegetation in advance of cutting, a very clear line of demarcation between cut and uncut vegetation is established, this being important as a guide in making an adjacent cutting path.

The improved shoe and diverter combination herein disclosed presents many advantages over prior devices heretofore proposed. It is simple and inexpensive, requires no driving power, and may be quickly and easily applied to and removed from the sickle when desired. The diverting action is highly effective, eliminating frequent stops in the course of the mowing operation to clear cuttings from the mechanism of the sickle and vital parts of the tractor.

It is to be understood that various modifications and changes may be made in the structure of the device, within the scope of the appended claims, without departing from the spirit of the invention. For example, the number of vibratory rods 90, 92 may be increased or decreased; means other than the washers 65 may be employed to vary the height of the sickle cutter; and the portions 83, 90, 92 of the diverter rods may be made somewhat curved, if desired, without defeating the intended function thereof.

I claim:

1. A combined shoe and diverter for attachment to a reciprocating cutter type sickle, comprising in combination, an elongate shoe having an upwardly curved toe, an upwardly curved heel, and an intermediate portion, a pair of spaced substantially parallel perforate wings upstanding on the shoe near the toe thereof, providing a channel in a substantially vertical plane, a cutting diverter rod having an eye at one end thereof disposed within the channel aforesaid, and fastening means passing through the eye and through the perforations of the wings, means at the opposite end of the diverter rod for anchoring same to a tractor frame, the rod between said ends being bent to an approximate half-loop near the eye aforesaid, said loop resting in an upright plane above and forwardly of the toe of the shoe, a bend in the diverter rod beyond said loop, directing a substantially straight section of the rod obliquely to one side and rearwardly of the shoe, said straight section terminating in a downwardly turned portion carrying the aforesaid anchoring means, a second diverter rod including a connection with the shoe wings, and extending obliquely to one side and rearwardly of the shoe in the same general direction as the substantially straight section of the diverter rod first mentioned, and means between the toe and the heel of the shoe, for anchoring the shoe to a sickle cutter bar.

2. A combined shoe and diverter in accordance with claim 1, characterized by the fact that the second diverter rod is long and inherently resilient, with a free end unsupported to induce vibratory movement thereof during operation of the sickle.

3. A combined shoe and diverter in accordance with claim 1, characterized by the fact that the connection between the second diverter rod and the shoe wings is above the base of the channel formed by the wings, leaving space at the base of the channel for insertion of a cutter guard of the sickle.

4. A shoe for attachment to the cutter bar and cutter guard of a power sickle, said shoe comprising an elongate body having an upwardly and forwardly directed toe, a heel turned upwardly at the rear of the shoe, and an intermediate portion, a pair of spaced substantially parallel perforate wings upstanding on the shoe near the toe thereof, providing a channel in a substantially vertical plane, the channel being of proper dimensions at the rear thereof to accommodate the point of a cutter guard of a sickle, and means between the toe and the heel of the shoe, for anchoring the shoe to a sickle cutter bar.

5. An attachment for use with a tractor-supported reciprocating cutter type sickle including a cutter bar and an endmost cutter guard; said attachment comprising a shoe having means thereon for connecting the same to said guard, a plurality of diverter arms extending from the shoe adjacent one end thereof and extending laterally obliquely therefrom, and at least one diverter arm extending from said shoe obliquely and overlying the other said arms and having means at its opposite end for connection to said tractor.

6. An attachment for use with a tractor-supported reciprocating cutter type sickle including a cutter bar and an endmost cutter guard; said attachment comprising a shoe having means thereon for connecting the same to said guard, a plurality of diverter arms extending laterally obliquely from the shoe, the arms each having an end mounted upon the shoe, and at least one diverter arm extending from said shoe obliquely and overlying the other arm, said one overlying arm being directed beyond the other arm a distance sufficient to substantially span the width of the tractor, and means at the opposite end of said one diverter arm for connection thereof to said tractor.

7. An attachment for use with a tractor-supported reciprocating cutter type sickle including a cutter bar and a series of cutter guards; said attachment comprising a shoe having means thereon for connecting the same to one of said guards, at least one vibratory diverter arm extending laterally obliquely from the shoe and having one end loosely mounted upon the shoe to induce vibratory action of the arm incident to movements of the sickle when operating, the other end of said one arm being free to vibrate, a main diverter arm overlying the vibratory diverter arm first mentioned, means mounting one end of the main diverter arm upon the shoe, and means to anchor the other end of said main diverter arm to said tractor.

8. An attachment as specified in claim 7, wherein the intermediate section of the main diverter arm is extended, to substantially span the width of the tractor.

9. An attachment for use with a tractor-supported reciprocating cutter type sickle including a cutter bar and a series of cutter guards, said attachment comprising a shoe having means thereon for connecting the same to a guard located intermediate the ends of the cutter bar, a plurality of diverter arms extending from the shoe laterally obliquely therefrom and in generally opposite directions from the major axis of the shoe, and at least one diverter arm at each side of the shoe axis extending from said shoe obliquely and overlying the other said arms, said overlying arms having means at their ends remote from the shoe for connection to said tractor.

10. An attachment according to claim 9, wherein the diverter arms extend from the shoe at locations which are ahead of the cutter bar.

CARL VAN AUSDALL.

REFERENCES CITED

The following references are of record in the file of this patent:

UNITED STATES PATENTS

| Number | Name | Date |
|---|---|---|
| 412,102 | Lamrock | Oct. 1, 1889 |
| 593,261 | Wettlaufer | Nov. 9, 1897 |
| 930,617 | Riley | Aug. 10, 1909 |
| 1,684,886 | Rabie | Sept. 18, 1928 |
| 2,011,923 | Welty | Aug. 20, 1935 |